(12) United States Patent
Mansour et al.

(10) Patent No.: US 7,028,483 B2
(45) Date of Patent: Apr. 18, 2006

(54) MACROLAMINATE RADIAL INJECTOR

(75) Inventors: Adel B. Mansour, Mentor, OH (US); Andrew M. Odar, Chardon, OH (US); Erlendur Steinthorsson, Westlake, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/889,842

(22) Filed: Jul. 13, 2004

(65) Prior Publication Data
US 2005/0103019 A1 May 19, 2005

Related U.S. Application Data

(60) Provisional application No. 60/487,092, filed on Jul. 14, 2003, provisional application No. 60/498,626, filed on Aug. 28, 2003.

(51) Int. Cl.
*F23R 3/28* (2006.01)
(52) U.S. Cl. .......................................... 60/748; 60/740
(58) Field of Classification Search ................. 60/740, 60/748, 742
See application file for complete search history.

(56) References Cited

U.S. PATENT DOCUMENTS

| | | | |
|---|---|---|---|
| 2,551,276 A | 5/1951 | McMahan | |
| 3,605,408 A | 9/1971 | McGough | |
| 3,608,833 A | 9/1971 | Haskins et al. | |
| 3,612,397 A | 10/1971 | Pearson | |
| 3,615,054 A | 10/1971 | Botz | |
| 3,710,574 A | 1/1973 | Pearson | |
| 3,914,348 A | 10/1975 | Kors et al. | |
| 4,222,243 A | 9/1980 | Mobsby | |
| 4,425,755 A | 1/1984 | Hughes | |
| 5,038,857 A | 8/1991 | Claccio | |
| 5,435,884 A | 7/1995 | Simmons et al. | |
| 5,479,705 A | 1/1996 | Fowler et al. | |
| 5,484,977 A | 1/1996 | Douglas | |
| 6,311,473 B1 | 11/2001 | Benjamin et al. | |
| 6,321,541 B1 | 11/2001 | Wrubel et al. | |
| 6,363,726 B1 | 4/2002 | Durbin et al. | |
| 6,367,262 B1 | 4/2002 | Mongia et al. | |
| 6,381,964 B1 | 5/2002 | Prichard, Jr. et al. | |
| 6,389,815 B1 | 5/2002 | Hura et al. | |
| 6,418,726 B1 | 7/2002 | Foust et al. | |
| 6,523,350 B1 * | 2/2003 | Mancini et al. ............... | 60/740 |
| 6,672,066 B1 * | 1/2004 | Wrubel et al. ................ | 60/740 |
| 6,718,770 B1 * | 4/2004 | Laing et al. .................. | 60/740 |
| 2002/0014079 A1 * | 2/2002 | Wrubel et al. ................ | 60/740 |
| 2002/0189259 A1 * | 12/2002 | Laing et al. .................. | 60/740 |
| 2004/0148937 A1 * | 8/2004 | Mancini ...................... | 60/740 |
| 2004/0250547 A1 * | 12/2004 | Mancini et al. ............... | 60/740 |

* cited by examiner

*Primary Examiner*—Ehud Gartenberg
(74) *Attorney, Agent, or Firm*—Christopher H. Hunter (57) ABSTRACT

An injector assembly includes a barrel-shaped housing and an injector, the injector including a feed ring formed of multiple, etched, T-shaped plates. A plurality of nozzles are arranged in an evenly-spaced array around the injector and direct fluid radially inward into the central annulus of the injector assembly. The injector includes an air inlet port with an internal feed passage fluidly connected to swirl chambers and exit orifices to provide individual sprays of fuel from the nozzles. Integral air swirlers impart a swirling component of motion to the fuel sprays. A venturi configuration is provided by the housing. The nozzles are provided along the venturi configuration, which maintains fluid separation from the walls of the housing downstream from the venturi.

32 Claims, 10 Drawing Sheets

MACROLAMINATE RADIAL INJECTOR

CROSS-REFERENCE TO RELATED CASES

The present application claims the benefit of the filing date of U.S. Provisional Application Ser. No. 60/487,092; filed Jul. 14, 2003 and U.S. Provisional Ser. No. 60/498,626; filed Aug. 28, 2003, the disclosures of which are expressly incorporated herein by reference.

FIELD OF THE INVENTION

This invention relates in general to injectors for dispensing fluids in fine sprays, and more particularly relates to fuel injectors for dispensing liquid fuel in fine sprays for ignition in gas turbine engines.

DESCRIPTION OF THE PRIOR ART

The art of producing sprays of liquid is extensive. Many injectors have a nozzle with a swirl chamber. One or more angled inlet slots direct the fluid to be sprayed into the swirl chamber. The inlet slots cause the fluid to create a vortex in the swirl chamber adjacent to a spray orifice. The fluid then exits through the spray orifice in a conical spray. Patents showing such injectors include U.S. Pat. Nos. 4,613,079 and 4,134,606.

In the combustion of fuels, a nozzle that provides a spray of fine droplets improves the efficiency of combustion and reduces the production of undesirable air pollutants. In some applications, it is desirable to have very low Flow Numbers and Flow Numbers that vary from location to location. The "Flow Number" relates the rate of fluid flow output to the applied inlet pressure. Flow Numbers that are less than 1.0 lb/hr.psi$^{0.5}$, and even as small as 0.1 lb/hr.psi$^{0.5}$, are desirable in some applications. This corresponds to swirl chambers less than 1.905 mm (0.075 inches); and exit orifices of less than 0.3048 mm (0.012 inches) diameter.

It is believed that for many years it was only possible to manufacture many of the openings and surfaces of small nozzles to create such low Flow Numbers by using relatively low volume machine tool and hand tool operations in connection with high magnification and examination techniques. This was a labor-intensive process with a high rejection or scrap rate.

One technique which has overcome this problem and produces spray nozzles having Flow Numbers as low as 0.1 lb/hr.psi$^{0.5}$ is described and illustrated in U.S. Pat. No. 5,435,884. In this patent, which is owned by the assignee of the present application, a nozzle having a small swirl chamber, exit orifice and feed slots is provided that produces a fine droplet spray. The swirl chamber, exit orifice and feed slots are formed by chemical etching the surfaces of one or more thin metal plates. The etching produces a nozzle with very streamlined geometries thereby resulting in significant reductions in pressure losses and enhanced spray performance. The chemical etching process is easily repeatable and highly accurate, and can produce multiple nozzles for individual or simultaneous use.

The nozzle shown and described in the '884 patent has many advantages over the prior art, mechanically-formed nozzles, and has received acceptance in the marketplace. The nozzle has design features that allow it to be integrated into an affordable multi-point fuel injection scheme. One particular application for such a nozzle is described in U.S. Pat. No. 6,550,696, also owned by the assignee of the present invention, where an integral air swirler, provided in one or more etched plates of the injector, is combined with the nozzle allowing the introduction of fuel sprays into an air flow. By premixing the fuel and air, a homogeneous fuel-air mixture is achieved, localized regions of near stoichiometric fuel-air mixtures are avoided, and a reduction in Nitrous Oxide (NOx) and Carbon Monoxide (CO) emissions can be realized.

The injector described in the '696 patent achieves some fundamental advantages, and has a plurality of nozzles arranged in a matrix across the surface of the injector, with the nozzles oriented to provide sprays of fuel in the axial (downstream) direction.

A similar arrangement is shown in U.S. Pat. No. 6,311,473, where the axial sprays are arranged in an annular configuration in a single plane, and outwardly bounded by an annular sheet of air, to avoid impinging on the downstream walls of the housing. Downstream radial air swirlers are also provided to facilitate vaporization of the fuel.

Certain applications require the use of radial, rather than axial-directed nozzles. Such an arrangement can provide some advantages. It is known to provide an injector comprising a plurality of plates with etched passages, where the plates have a T-shaped design, and which are then mechanically formed into a cylindrical, ring-shaped configuration, such as shown and described in U.S. Pat. No. 6,321,541, also owned by the assignee of the present invention. The fuel is dispensed radially inward (or outward) through nozzles spaced around the circumferences of the ring. In this application however, air swirlers are not disclosed, which again, can be useful in some application to achieve better overall combustion.

It is believed there is a demand for a fuel injector with a nozzle assembly having a cylindrical configuration for gas turbine applications with a plurality of nozzles that are compact and lightweight, and where each nozzle includes integral structure that allows the introduction of air (or another fluid) into or in conjunction with the fuel. It is further believed that there is a demand, particularly for gas turbine applications, for an injector with a feed ring that has a plurality of nozzles with a low Flow Number and integral air swirlers to reduce NOX and CO emissions, improve spray patternization, and provide a fuel spray that is well dispersed for efficient combustion.

SUMMARY OF THE INVENTION

The present invention provides a novel and unique fuel injector having a cylindrical configuration and a plurality of compact and lightweight nozzles that provide sprays of fine droplets of fuel, and includes integral structure that allows the introduction of air or other fluid into or in conjunction with the fuel. According to one application of the invention, the injector is useful for gas turbine applications and includes a feed ring with a plurality of nozzles spaced around the circumference of the ring, where each nozzle has a low Flow Number, and an integral air swirler that reduces NOX and CO emissions. The nozzles provide good spray patternization and the fuel spray is well dispersed for efficient combustion. In addition, the nozzles can be accurately and repeatably manufactured.

According to the present invention, the feed ring of the injector includes a plurality of thin, flat T-shaped plates of etchable material disposed in adjacent, surface-to-surface contact with one another. A plurality of nozzles are formed in a linear, evenly-spaced array along the head nozzle portion (transversely extending arms) of the plates. Each nozzle includes a metering assembly formed in one or more of the plates to provide a fine spray of fuel; and an integral swirler structure formed in one or more of the plates. The swirler structure allows the introduction of air or other fluid into or in conjunction with the fuel spray.

The metering assembly preferably includes a bowl-shaped swirl chamber shaped by etching at least one of the plates. Chemical etching, electro-mechanical etching or other appropriate etching technique can be used to form the swirl chamber. A spray orifice, also preferably formed by etching, is in fluid communication with the center of the swirl chamber. At least one feed slot, also preferably formed by etching, is in fluid communication with the swirl chamber and extends in tangential (non-radial) relation thereto. Fuel directed through the feed slot(s) moves in a vortex motion toward the center of the swirl chamber, and then exits the spray orifice in the conical spray of fine droplets.

The swirler structure preferably provides a swirling component of motion to the fuel spray. The swirler structure preferably includes a cylindrical swirler passage, also shaped by etching through at least one of the other plates. The cylindrical swirler passage is located in co-axial relation to the spray orifice of the metering set, such that the fuel from the spray orifice passes through the swirler passage. At least one air feed slot, also preferably formed by etching, is provided in fluid communication with the swirler passage and extends in tangential (non-radial) relation thereto. The second fluid (air) is provided through the feed slot and moves in a swirling motion in the swirler passage. The second fluid imparts a swirling component of motion to the fuel as the fuel passes through the swirler passage. The feed slot(s) can be oriented to provide fluid streams in the same direction (co-rotating), or in opposite directions (counter-rotating). In some applications the air feed slots could be purely radial, such that the air is not caused to swirl.

Supply passages for the second fluid extend through the plates of the metering set and the swirler structure to the feed slots in each plate of the swirler structure.

The plates of the feed ring are fastened together (such as by bonding), and are mechanically formed such that the arms of the ring define a cylinder, with the nozzles preferably oriented to dispense fuel radially inward into the annulus of the injector, although the strip could also be configured to dispense fuel radially outward merely by bending the strip in the opposite direction (or forming the nozzles on the opposite side of the strip).

The feed ring is supported within a barrel-shaped housing, which preferably includes an upstream housing portion and a downstream housing portion, each of which has a chamber portion which when the housing portions are assembled together, define a ring chamber for the feed ring. The downstream housing portion includes an inner annular flange that radially inwardly supports the feed ring, and a series of ports to allow fuel to pass from the ring radially inward toward the central axis of the housing. The inner housing flange also includes a venturi configuration, that is, an annular geometry projecting radially-inward toward the central axis of the housing, and causing fuel sprayed out through the ports to remain separated from the downstream walls of the housing to facilitate efficient combustion. The ports are preferably formed along about the axial midpoint of the venturi configuration.

Injectors constructed according to the present invention have a cylindrical configuration that is lightweight and compact, and can be used to introduce a second fluid into a fuel spray. In gas turbine applications, the injector can be used to introduce a swirling air flow into a fuel spray to enhance mixing and reduce NOX and CO emissions from the gas turbine engine. The swirling flow also enhances flame stability by generating toroidal recirculation zones that bring combustion products back towards the fuel injection apparatus thereby resulting in a sustained combustion and a stable flame. The swirling flow also provides good spray patternization and the fuel spray is well-dispersed for efficient combustion.

Further features of the present invention will become apparent to those skilled in the art upon reviewing the following specification and attached drawings

DESCRIPTION OF THE PREFERRED EMBODIMENTS

Figure 1:
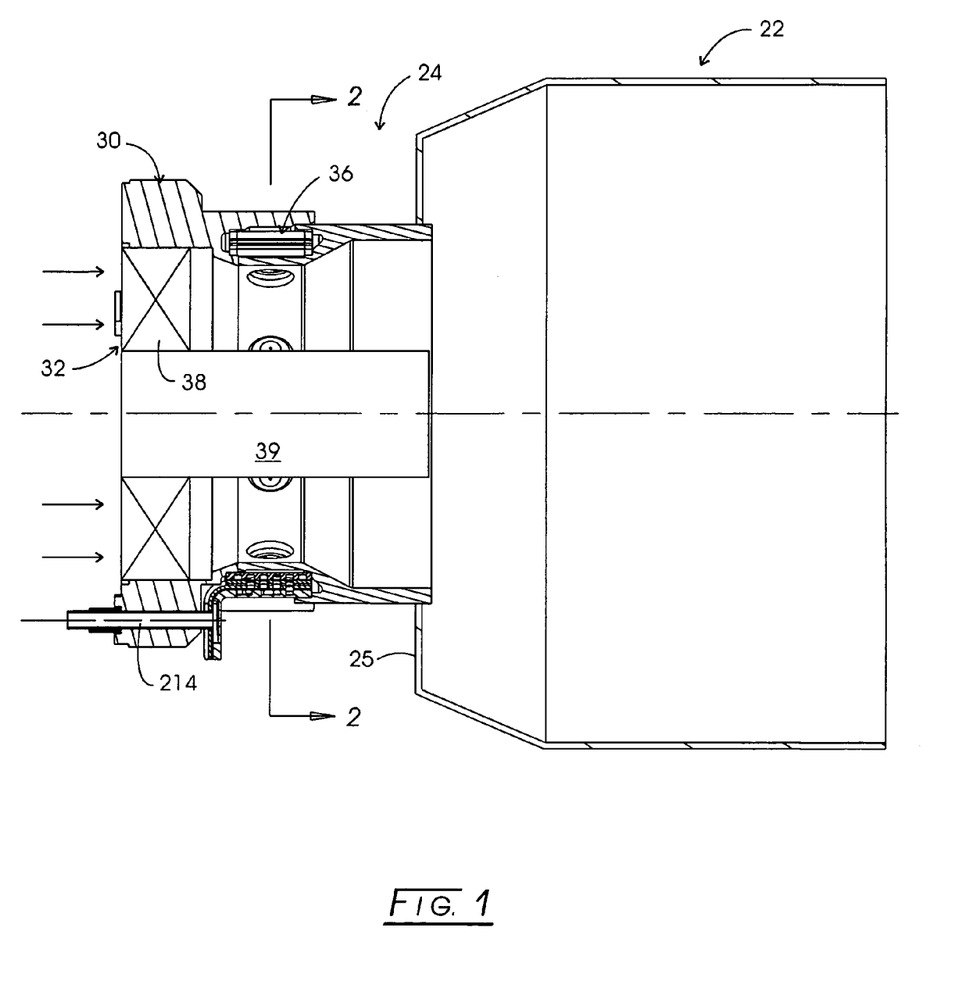
FIG. 1 is a cross-section side view of a combustion system for a gas turbine engine, with a fuel injector assembly constructed according to the present invention.

Referring to the drawings and initially to FIG. 1, a portion of a combustion system for a turbine engine is indicated generally at 20. The system includes a combustion chamber 22; and a fuel injector assembly, indicated generally at 24, mounted to the upstream end wall 25 of the combustion chamber. The fuel injector assembly 24 atomizes and directs fuel into the combustion chamber 22 for burning, as should be well known to those skilled in the art. Combustion chamber 22 can be any useful type of combustion chamber, such as a combustion chamber for industrial power generation equipment; however, the present invention is believed useful for combustion chambers for other types of combustion applications, such as in ground vehicles, where a fine dispersion of fuel droplets of two fluids (e.g., a liquid fuel and air) is desirable. One particularly useful application for the combustion system of the present invention is in the premixer described in U.S. Pat. No. 6,311,473, owned by the assignee of the present invention and which is incorporated herein by reference. In any case, the combustion chamber will not be described herein for sake of brevity, with the exception that as should be known to those skilled in the art, air is compressed, mixed with the fuel, and directed into the combustion chamber and ignited, so that the expanding gases of combustion can rapidly move across and thus rotate turbine blades (not shown). While a single injector assembly is shown in FIG. 1, it should be appreciated that multiple injector assemblies could be used mounted to the combustor.

The fuel injector assembly 24 includes a barrel-shaped housing, indicated generally at 30; an another air swirler, indicated generally at 32; and a fuel injector, indicated generally at 36. The air swirler 32 preferably comprises an axial swirler having a series of helical vanes 38 for directing air in a swirling manner into the upstream end of the injector assembly. A center body 39 is centrally located in the housing and surrounded by swirler 32. Center body 39 comprises a pilot nozzle for introducing natural gas or liquid fuel into the fuel injector assembly. The pilot nozzle is useful to stabilize the flow when the fuel injector assembly is used in a lean premix mode, and may not be necessary in every application. In any event, the type of pilot nozzle useful for the particular application can be determined by those skilled in the art.

Referring to FIGS. 2–5, the fuel injector 36 comprises a feed ring, indicated generally at 67 having an inlet port 68. The feed ring is preferably formed from relatively thin (e.g., 0.005–0.090 inches thick), flat plates 76–81 which are located in adjacent, surface-to-surface contact with each other. As can be seen in FIGS. 6A–11A, each of the plates 76–81 preferably has a T-shaped configuration, and is formed in one piece from a metal sheet of an appropriate material such as INCONEL 600. Each plate can be formed in the required configuration (such as the illustrated T-shape configuration) by durable etching, stamping or die-cutting. While six plates are illustrated and described, it is of course possible that a greater or lesser number of plates could be provided, and that the shape of the individual plates may be other than as illustrated, for example, they could simply be elongated flat strips (i.e., not "T" shaped).

Figure 6A:
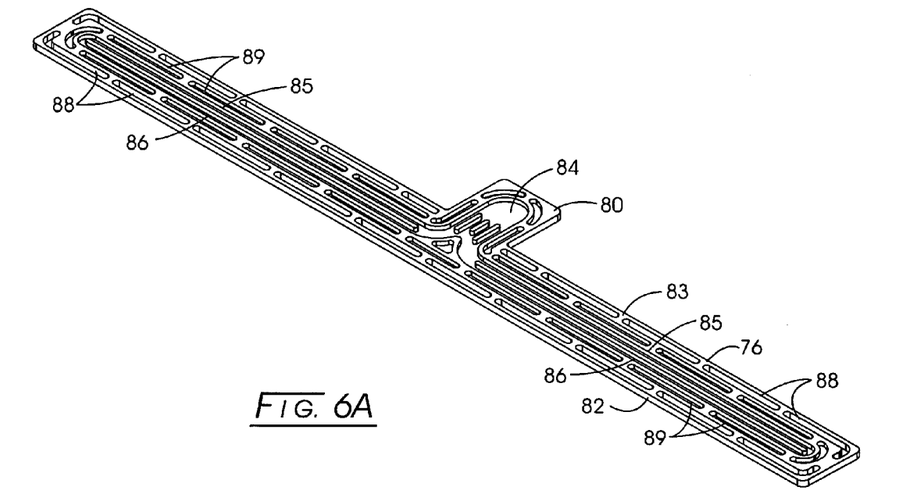
FIG. 6A is an elevated perspective view of the manifold plate for the injector of FIG. 4.
Figure 6B:
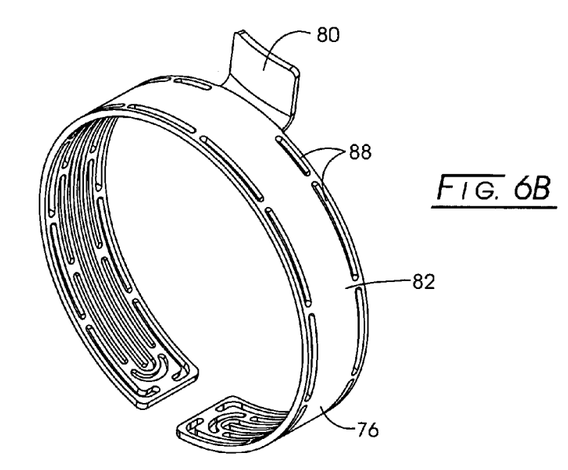
FIG. 6B is an elevated plan view of the manifold plate after forming.

As shown in FIGS. 6A and 6B, the first, manifold plate 76, has a short feed portion 80 and an elongated head nozzle portion 82, extending substantially perpendicular to the feed portion 80. A fuel feed passage is formed on an inner surface 83 of the plate. The feed passage includes an enlarged cavity in the feed portion 80; and a pair of thin channels or grooves 85, 86, which are fluidly connected to the cavity 84, and extend outwardly centrally along each arm of the head nozzle portion in parallel, spaced relation, along substantially the entire length of the opposing arms. The distal ends of the respective channels 85, 86 can be fluidly interconnected.

Slotted through-passages as at 88 are provided through the head nozzle portion of plate 76, and extend along the peripheral edge, to allow the passage of air, as will be described below. The number, spacing and dimension of the passages 88 can vary, as will also be described below.

A series of elongated slots as at 89 are interposed between the fuel channels 85, 86 and the through passages 88, and define stagnant air gaps for thermal protection. The number, spacing and dimension of slots 89 can also vary, as will be described below.

The cavity, grooves, passages and slots in the manifold plate 76 are preferably formed when the plate is flat (FIG. 6A). The cavity, grooves, passages and slots can be formed in any appropriate manner, and it is preferred that they be formed by etching, such as chemical etching, electro-mechanical etching or other appropriate etching technique. The etching of such plates should be known to those skilled in the art, and is described for example in Simmons, U.S. Pat. No. 5,435,884, which is hereby incorporated by reference. The etching of the plates allows the forming of very fine, well-defined and complex openings and passages, which provides a hydraulically natural shape for efficient fluid flow.

Figure 7A:
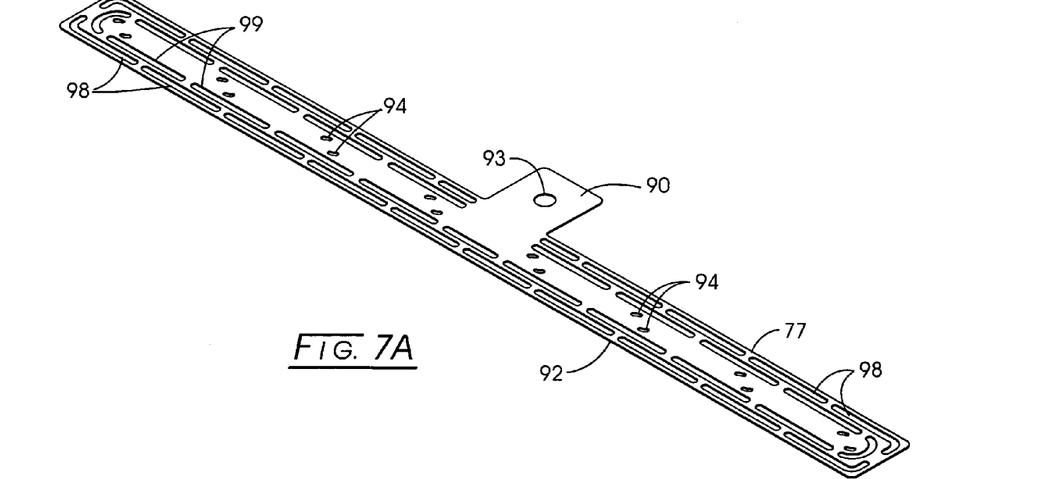
FIG. 7A is an elevated perspective view of the distribution plate for the injector.
Figure 7B:
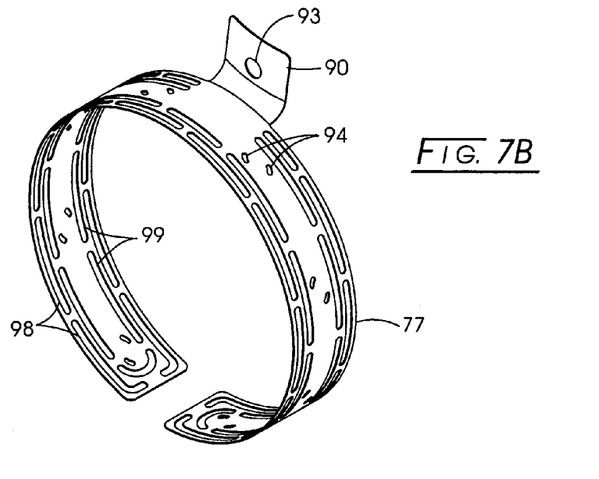
FIG. 7B is an elevated plan view of the distribution plate after forming.

Referring now to FIGS. 7A, 7B, the second, distribution plate 77 is similarly constructed and includes a short feed portion 90 and an elongated head nozzle portion 92, extending substantially perpendicular to the feed portion 90. An inlet passage 93 is formed centrally through feed portion 90. Pairs of spaced-apart fuel distribution through-slots, as at 94, are formed along the length of the arms of the head nozzle portion 92.

Slotted through-passages as at 98 are provided through the distribution plate 77, and extend along the peripheral edge, to allow the passage of air, in the same manner as passages 88 in manifold plate 76.

A series of elongated slots as at 99 are interposed between the fuel slots 94 and the through passages 98, and define stagnant air gaps for thermal protection in the same manner as slots 89 in manifold plate 76.

The passages and slots in the distribution plate 77 are also preferably formed when manifold plate 76 is flat, in the same manner as described above. When the distribution plate 77 is located adjacent, surface-to-surface relation to manifold plate 76, inlet passage 93 in plate 77 is fluidly aligned and communicates with cavity 84 in adjacent manifold plate 76. Likewise, each fuel distribution slot 94 in plate 77 is fluidly aligned and communicates with a respective fuel channel 85, 86 in the adjacent manifold plate 76. The through-passages 98 and slots 99 in distribution plate 77 are likewise fluidly aligned and communicate with respective passages 88 and slots 89 in the adjacent manifold plate 76 (see FIG. 4).

Figure 8A:
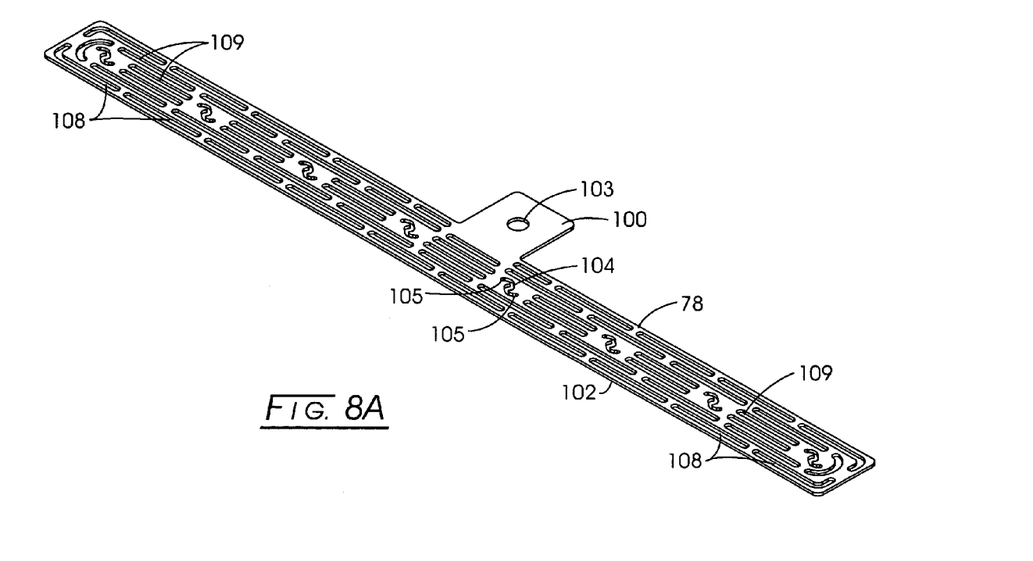
FIG. 8A is an elevated perspective view of the spin plate for the injector.
Figure 8B:
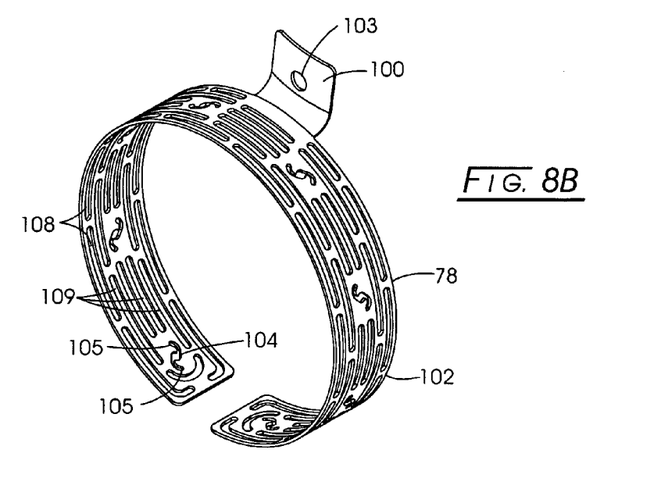
FIG. 8B is an elevated plan view of the spin plate after forming.

Referring now to FIGS. 8A and 8B, third, spin plate 78 is similarly constructed and includes a short feed portion 100 and an elongated head nozzle portion 102, extending substantially perpendicular to the feed portion 100. An inlet passage 103 is formed centrally through feed portion 100. Spin chambers as at 104 with non-radial feed slots as at 105, are formed along the length of the arms of the head nozzle portion 102, and extend through the plate from one side to the other.

Slotted through-passages as at 108 are provided through the spin plate 78, and extend along the peripheral edge, to allow the passage of air, in the same manner as passages 98 in distribution plate 77.

A series of elongated slots as at 109 are interposed between the swirl chambers 104 and the through passages 108, and also between adjacent swirl chambers, and define stagnant air gaps for thermal protection in the same manner as slots 99 in distribution plate 77.

The passages and slots in spin plate 78 are also preferably formed when the spin plate 78 is flat, in the same manner as described above. The spin plate 78 is located in adjacent, surface-to-surface relation with distribution plate 77. When so located, inlet passage 103 in plate 78 is fluidly aligned and communicates with inlet passage 93 in adjacent distribution plate 77. Each feed slot 105 is fluidly aligned and communicates with the distal end of a respective one of the fuel distribution slots 94 in the adjacent distribution plate 77. The through-passages 108 and slots 109 in spin plate 78 are likewise fluidly aligned and communicate with respective passages 98 and slots 99 in the adjacent distribution plate 77 (see FIG. 4).

Figure 9A:
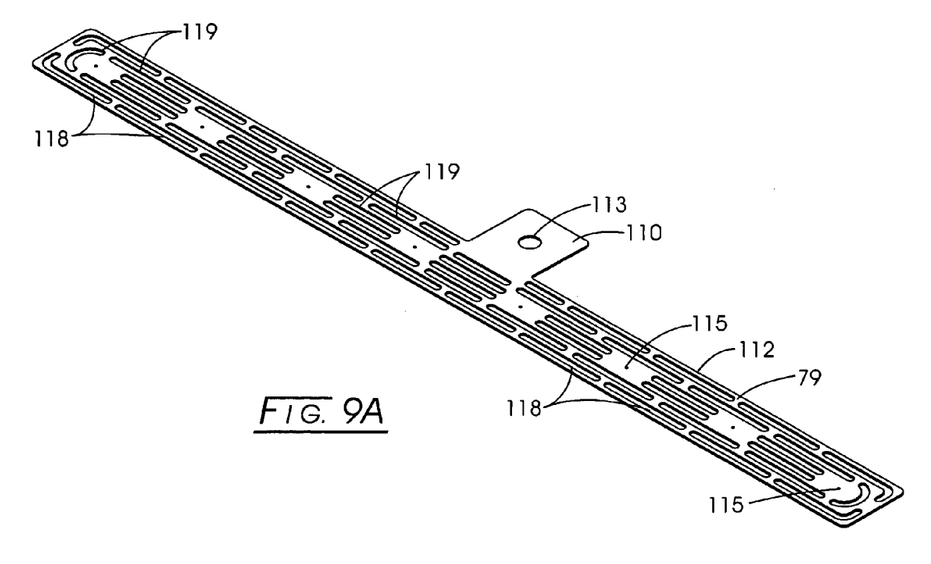
FIG. 9A is an elevated perspective view of the orifice plate for the injector.
Figure 9B:
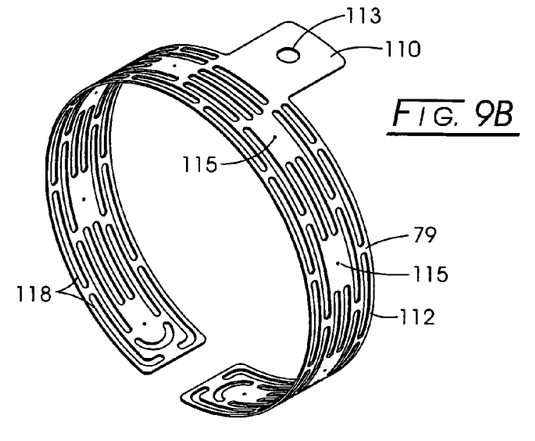
FIG. 9B is an elevated plan view of the orifice plate after forming.

Referring now to FIGS. 9A and 9B, fourth, orifice plate 79 is similarly constructed and includes a short feed portion 110 and an elongated head nozzle portion 112, extending substantially perpendicular to the feed portion 110. An inlet passage 113 is formed centrally through feed portion 110. Small circular orifices as at 115 are formed along the length of the arms of the head nozzle portion 112, and extend through the plate from one side to the other.

Slotted through-passages as at 118 are provided through the orifice plate 79, and extend along the peripheral edge, to allow the passage of air, in the same manner as passages 108 in spin plate 78.

A series of elongated slots as at 119 are interposed between the orifices 115 and the through passages 118, and also between adjacent orifices, and define stagnant air gaps for thermal protection in the same manner as slots 109 in spin plate 78.

The orifices, passages and slots in orifice plate 79 are preferably formed when orifice plate 79 is flat, in the same manner as described above. The orifice plate is located in adjacent, surface-to-surface relation with spin plate 78. When so located, inlet passage 113 in plate 79 is fluidly aligned and communicates with inlet passage 103 in adjacent spin plate 78. Each orifice 115 is centrally, fluidly aligned and communicates with a respective spin chamber 104 in the adjacent spin plate 78. The through-passages 118 and slots 119 in orifice plate 79 are likewise fluidly aligned and communicate with respective passages 108 and slots 109 in the adjacent spin plate 78 (see FIG. 4).

Figures 10A, 10B:
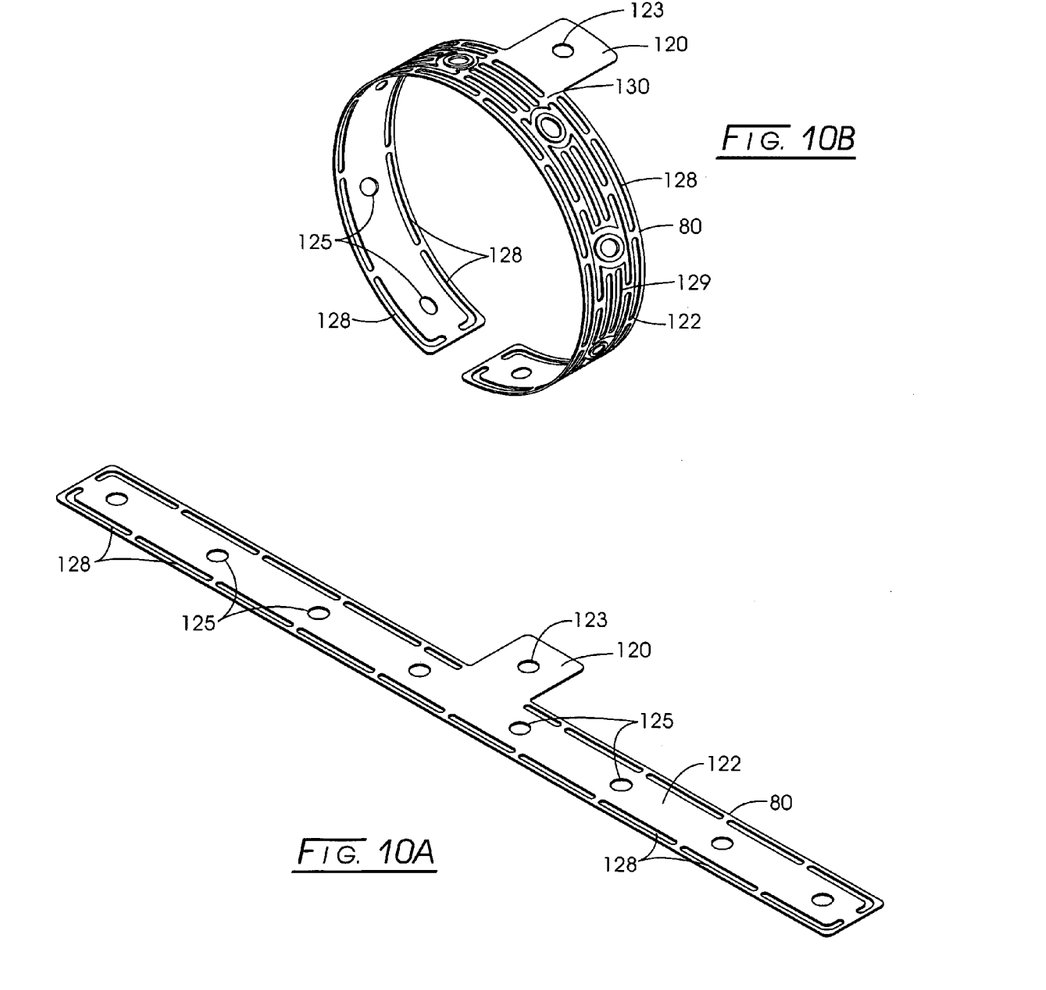
FIG. 10A is an elevated perspective view of the heat shield plate for the injector.
FIG. 10B is an elevated plan view of the heat shield plate after forming.

Referring now to FIGS. 10A and 10B, fifth, heat shield plate 80 is similarly constructed and includes a short feed portion 120 and an elongated head nozzle portion 122, extending substantially perpendicular to the feed portion 120. An inlet passage 123 is formed centrally through feed portion 120. Circular orifices as at 125, of a diameter larger than orifices 115 in orifice plate 79, are formed along the arms of the head nozzle portion 122, and extend through the plate from one side to the other.

Slotted through-passages as at 128 are provided through the heat shield plate 80, and extend along the peripheral edge, to allow the passage of air, in the same manner as passages 118 in orifice plate 79.

A series of elongated channels or grooves as at 129 are formed on an outer surface 130 of the heat shield plate, and are interposed between the orifices 125 and the through passages 128, and also between adjacent orifices, and define stagnant air gaps for thermal protection in the same manner as slots 119 in orifice plate 79.

The orifices, passages and channels in heat shield plate 80 are preferably formed when heat shield plate 80 is flat, in the same manner as described above. The heat shield plate is located in adjacent, surface-to-surface contact with orifice plate 79. When so located, inlet passage 123 is fluidly aligned and communicates with inlet passage 113 in adjacent orifice plate 79. Each orifice 125 is co-axially, fluidly aligned with a respective orifice 115 in the adjacent orifice plate 79. The through passages 128 and channels 129 in heat shield plate 80 are likewise fluidly aligned and communicate with respective passages 118 and slots 119 in the adjacent orifice plate 79 (see FIG. 4).

Figures 11A, 11B:
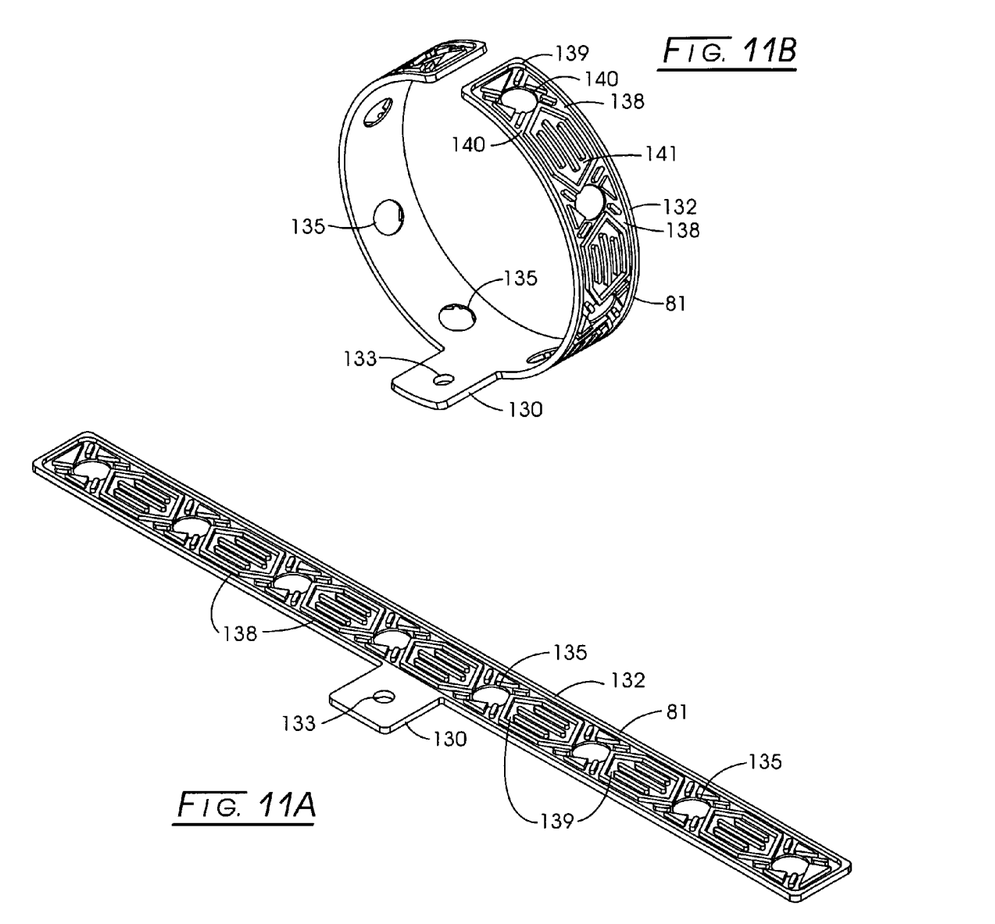
FIG. 11A is an elevated perspective view of the air swirler plate for the injector.
FIG. 11B is an elevated plan view of the air swirler plate after forming.

Referring now to FIGS. 11A and 11B, sixth, air swirler plate 81 is similarly constructed and includes a short feed portion 130 and an elongated head nozzle portion 132, extending substantially perpendicular to the feed portion 130. An inlet passage 133 is formed centrally through feed portion 130. Circular orifices as at 135, of a diameter larger than orifices 125 in heat shield plate 80, are formed along the length of the arms of the head nozzle portion 132, and extend through the plate from one side to the other.

Slotted channels or grooves as at 138 are provided along the outer surface 139 of air swirler plate 81, and extend along the peripheral edge, to direct the passage of air across the plate. Non-radial channels or grooves as at 141 fluidly interconnect with channels 138, and direct the air into orifices 135.

A series of channels as at 141 are also formed on the outer surface of the air swirler plate, and are interposed between the orifices 135 and channels 138 and 140, and also between adjacent orifices, and define stagnant air gaps for thermal protection.

The orifices and channels in the air swirler plate 81 are preferably formed when air swirler plate 81 is flat, in the same manner as described above. The air swirler plate is located in adjacent, surface-to-surface contact with heat shield plate 80. When so located, inlet passage 133 is fluidly aligned and communicates with inlet passage 123 in adjacent heat shield plate 80. Each orifice 135 is co-axially, fluidly aligned with a respective orifice 125 in the adjacent heat shield plate 80. The channels 138 in air swirler plate 81 are likewise fluidly aligned with respective passages 128 in the adjacent heat shield plate 80 (see FIG. 4).

After the plates are appropriately formed and stacked as above, the plates 76–81 are fixed together in an appropriate manner to form the complete feed ring 67. It is preferred that the plates are fixed together in surface-to-surface contact with a bonding process such as brazing or diffusion bonding. Such bonding processes are well-know to those skilled in the art, and provide a secure connection between the various plates. A more detailed discussion of such bonding can be found, for example, in U.S. Pat. No. 5,484,977; U.S. Pat. No. 5,479,705; and U.S. Pat. No. 5,038,857, among others.

Figure 4:
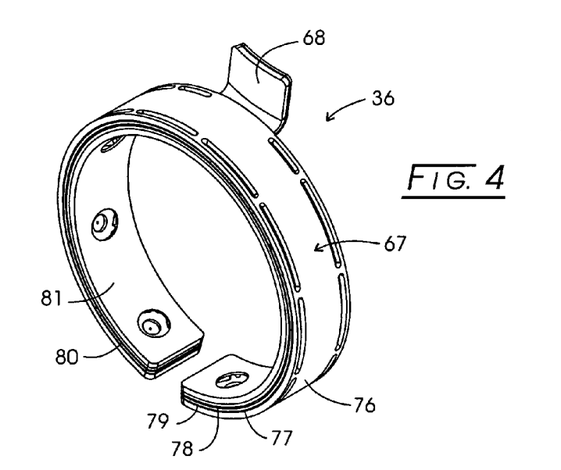
FIG. 4 is an elevated perspective view of the injector for the injector assembly of FIG. 3.

The head nozzle portions of all the plates are then mechanically formed (bent) into an appropriate configuration. As shown in FIG. 4, the head portions are illustrated as being formed into a cylindrical or annular configuration, such that manifold plate 76 is the radially outermost plate, and air swirler plate 81 is the radially innermost plate. The bending of the plates can be accomplished using appropriate equipment, for example, a cylindrical mandrel or other appropriately-shaped tool. A gap is preferably provided between the opposing, distal ends of the plates to allow for some thermal growth, however they could also be joined together by an appropriated process such as brazing or welding to form a continuously cylindrical nozzle. It should be noted that the plates could also be formed into shapes other than cylindrical, or even provided without forming, in appropriate applications.

The feed portions of the plates are then collectively bent at an angle, and preferably substantially normal to the plates, to create the inlet port 68.

Figure 3:
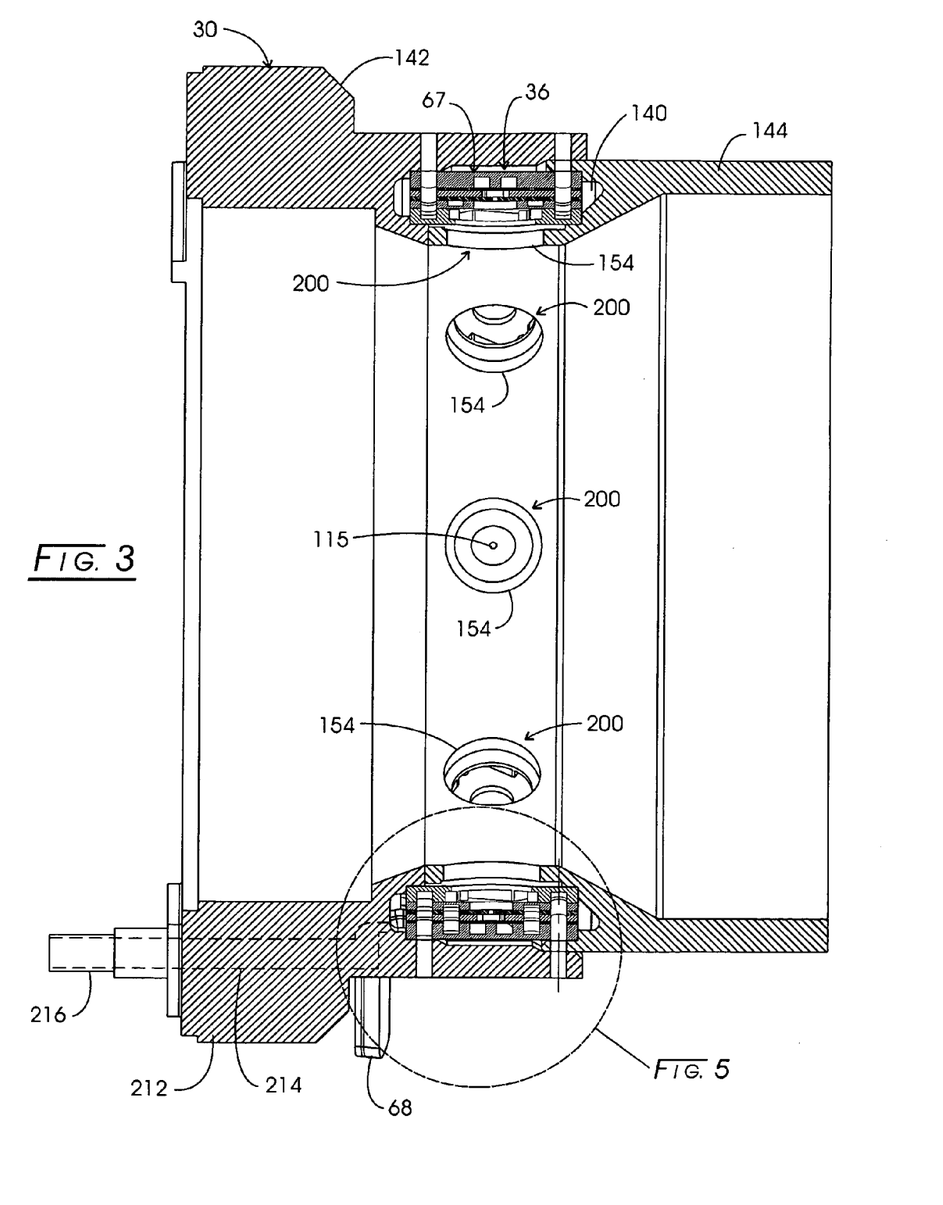
FIG. 3 is a cross-sectional side view of the injector assembly of FIG. 2 with the swirler removed.
Figure 5:
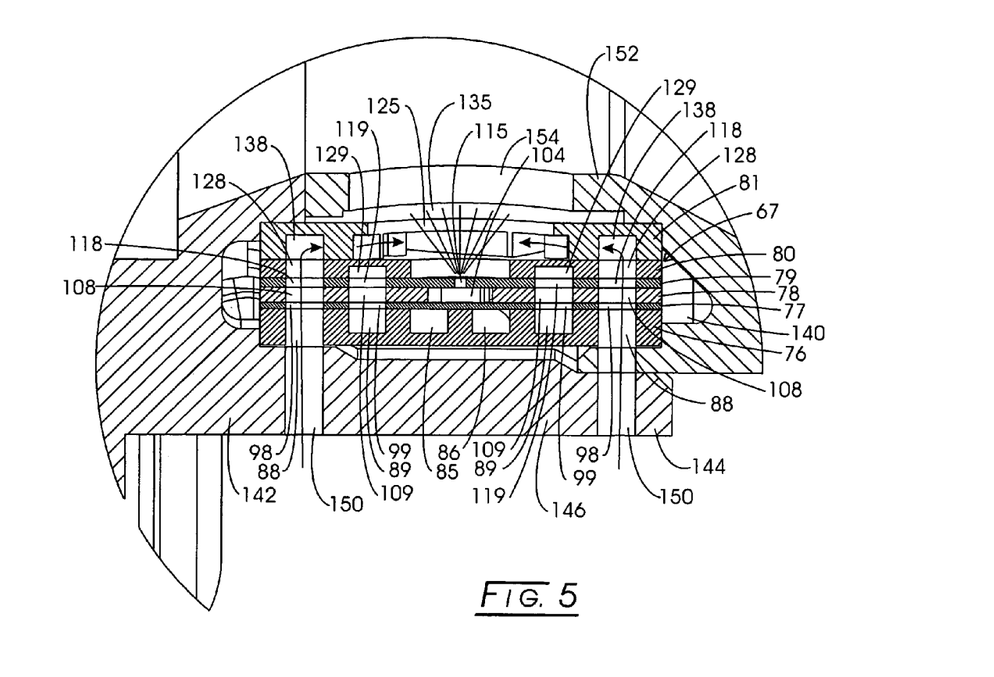
FIG. 5 is an enlarged cross-sectional side view of a portion of the injector assembly of FIG. 3.

Referring now to FIGS. 3 and 5, the injector 36, after it is assembled as above, is captured and supported within a ring chamber 140 formed in the barrel shaped housing 30. Housing 30 comprises an upstream annular housing portion 142 and a downstream annular housing portion 144, each of which includes a portion of the chamber, and which fit closely together to form the entire chamber. Upstream housing portion 142 includes an outer annular flange 146 which outwardly supports the feed ring 67, and which includes a series of slotted feed passages 150 which are fluidly aligned with and communicate with the air passages 88 in the manifold plate 76 (see FIG. 4) to direct air into the feed strip.

The downstream housing portion 144 also includes an annular flange 152, supporting the radially inner side of the feed ring. A series of openings 154 are formed around flange 152, having a dimension larger than the openings 135 in air swirler plate 81, and which are co-axially aligned therewith (see FIG. 4).

The housing portions 142, 144 are also fixed together in an appropriate manner after the plates are located in the ring chamber, such as by welding or brazing.

Figure 2:
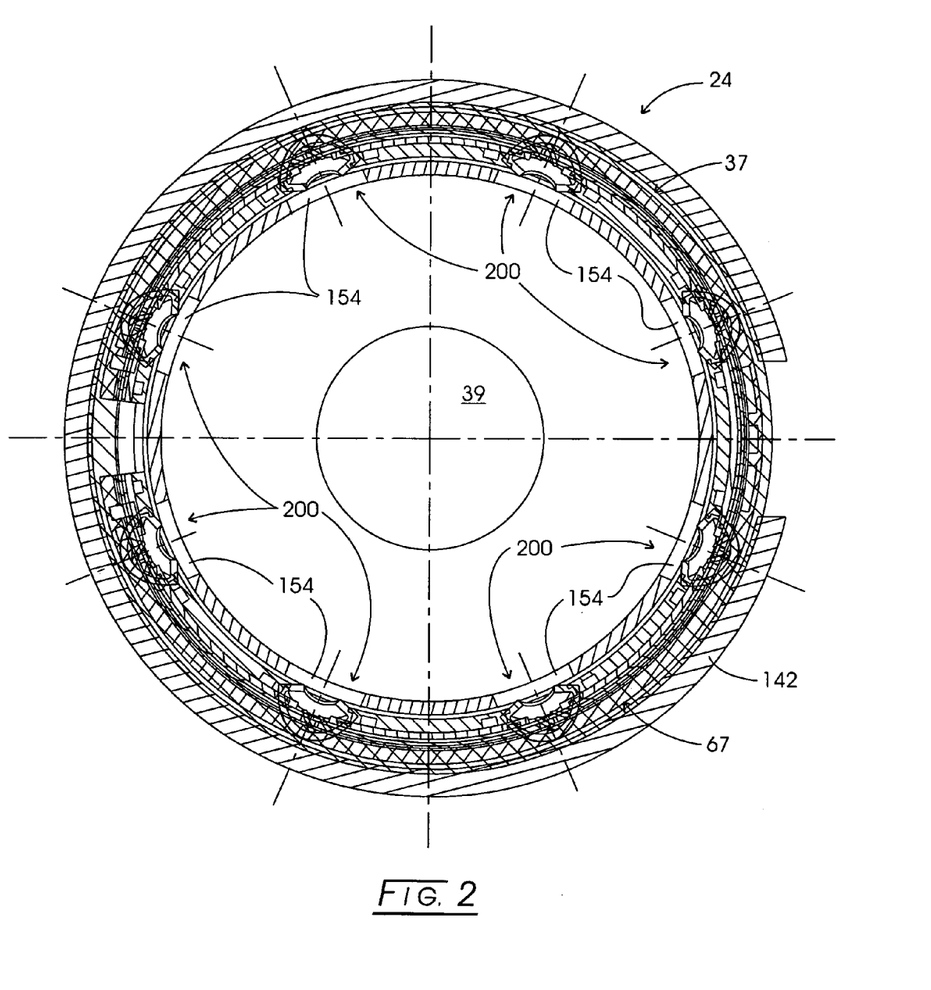
FIG. 2 is a cross-sectional end view of the injector assembly, taken substantially along the plane described by the lines 2—2 in FIG. 1.

When the injector is supported within the housing as described above, a series of nozzles as at 200, are defined around the circumference of the injector assembly (see FIG. 2). The nozzles are preferably evenly-spaced around the injector assembly, and the flow channels, slots and passages in each nozzle direct fuel from the feed stem 64 into chamber 84 in plate 76, where the fuel is directed (circumferentially) out through channels 85, 86 in plate 76 (FIG. 6A), and then radially inward through distribution slots 94 in plate 77 (FIG. 7A). The distribution slots 77 direct the fuel into feed slots 105 in plate 78 (FIG. 8A) where the fuel then is directed into swirl chamber 104 in a swirling manner. The fuel then passes radially inward through orifice 115 in the adjacent plate 79 (FIG. 9A) and is delivered in a conical spray through orifices 125, 135 in adjacent plates 80, 81 (FIGS. 10A, 11A). The foregoing defines the metering structure of the injector that meters fuel through the injector.

Air is provided through inlet passages 150 in housing 66, where the air passes through slots 88 in plate 76 (FIG. 6A), slots 98 in plate 77 (FIG. 7A), slots 108 in plate 78 (FIG. 8A), slots 118 in plate 79 (FIG. 9A), and slots 128 in plate 80 (FIG. 10A), where the air is then directed through channels 139 into non-radial feed channels 140 and into the fuel spray in a swirling manner, where the swirling air imparts a swirling component of motion to the fuel spray to facilitate atomization and uniform mixing. The above structure defines the integral air swirler aspect of the injector.

The swirling fuel sprays then pass through openings 154 in the downstream housing portion, and into the air stream passing axially through the housing.

While only a single air swirler plate is shown, it is of course possible that multiple plates could be provided, each providing separate levels of swirling air flows to add further components of swirl to the fuel spray. The number, spacing and dimensions of the air passages can also vary depending on the desired air flow to be imported to the fuel sprays. The air passages could also be configured to provide simply axial air flows, so that the air flow would not be swirling. While not as preferred as a swirling air flow, such a configuration may be appropriate in certain applications to provide a sufficiently atomized spray. The number, spacing and dimensions of each nozzle could likewise vary depending on the particular application.

The air flow through the plates provides thermal protection for the nozzles. The stagnant air gaps in the interconnecting passages 89 in plate 77 (FIG. 6A); passages 99 in plate 78 (FIG. 7A); passages 109 in plate 79 (FIG. 8A); passages 109 in plate 78 (FIG. 9a); and channels 129 in plate 80 (FIG. 10B) likewise provide thermal protection for the nozzles.

As should be appreciated, the spray nozzles 200 are provided around the radially-inner surface of the injector assembly in the illustrated embodiment to provide sprays of fuel radially-inward toward the central axis of the assembly. However, by appropriate routing of the fuel passages between the plates, or bending the plates in the opposite direction, the spray nozzles could likewise be formed in the radially-outer surface to direct fuel radially outward from the injector assembly.

As apparent in FIG. 4, inlet port 68 comprises a tab or flange which is defined when the plates are interfitted together. The inlet port 68 provides a fuel inlet connection to the fuel stem 64. The inlet port 68 includes aligned and fluidly-connected opening 293 in plate 77 (FIG. 7B), opening 103 in plate 78 (FIG. 8B), opening 113 in plate 79 (FIG. 9B), opening 123 in plate 80 (FIG. 10B) and opening 133 in plate 81 (FIG. 11B). Port 68 is located in abutting relation to the downstream surface of an annular, radially-enlarged flange 212 of upstream housing portion 142. A passage 214 is provided through flange 212 from a front nipple 216, and fluidly interconnects with opening 133 in plate 81. Nipple 216 is connected to an appropriate source of fuel (not shown).

The inner annular flange 152 of the downstream housing portion preferably has a venturi geometry to facilitate the flow of fuel and air through the nozzle assembly. As shown in FIGS. 3 and 5, the venturi configuration preferably comprises a radially-inward projecting geometry along the inside surface of one or both housing portions, which causes the fluid (air) flowing therepast to accelerate and converge toward the central axis of the housing. Upon introduction of the fuel through the nozzles, in a radially-inward manner, the accelerated air and venturi configuration cause the sprays to be redirected axially downstream through the housing, past the downstream lip of the downstream housing portion 144. The venturi geometry of the housing substantially prevents the fuel from wetting the walls of the housing, downstream of the venturi, and thereby detrimentally effecting the atomized sprays. Rather, the sprays somewhat converge toward the central axis of the housing, and then pass downstream from the housing in a fully atomized and well-dispersed spray.

It is preferred that the nozzles 200 are located at the axial midpoint of the venturi geometry, however, it is believed they could also be located anywhere from the beginning to the end point of the venturi geometry and have some beneficial effect on the distribution of fuel.

As should be appreciated, swirling air is provided downstream through the housing by the axial swirler 32, and directed past the nozzles. The swirling air flow impacts the fuel sprays along the venturi geometry; while air is also directed into inlet passages 150 (FIG. 5) and then internally of each nozzle to provide a swirl component of motion to each spray. When the swirling fuel spray passes through each nozzle 200, the fuel is impacted by the air passing downstream through the housing. The fuel/air mixture then passes out through the housing for burning in the combustion chamber.

If a pilot nozzle 39 is used, the fuel flow through the pilot and through nozzles 200 can be modulated to enhance combustion stability.

Again, while a single injector configuration is shown, such a structure is only for exemplary purposes, and it is possible that multiple injectors could be provided; and each injector could have more or fewer nozzles than illustrated, depending upon the particular application. Likewise, while a radially outer spray from the injector is shown, the spray could likewise be radially inner, or even axially from the end of the nozzle.

While nozzles 200 are pressure swirl atomizers for providing a hollow conical air atomized fuel spray, it should be appreciated that other nozzle designs could alternatively (or in addition) be used with the present invention to provide other spray geometries, such as plain jet, solid cone, flat spray, etc. Also, while identical round spray orifices 115 are shown in fuel swirler plate 79 (FIG. 9A), it should be appreciated that the dimensions and geometries of the orifices may vary across the plate, to tailor the fuel spray volume to a particular application. This can be easily accomplished by the aforementioned etching process.

It has been found that the air enhances mixing and reduces NOX and CO emissions from the gas turbine engine, and reduces flame blowout. The metering set and integral swirler structure also provide good spray patternization and the spray is well-dispersed for efficient combustion. The nozzles can also be accurately and repeatably manufactured.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An injector assembly, comprising:
   an injector comprising an elongated, essentially flat feed strip in cross-section formed into a ring, said ring including a plurality of thin plates of etchable material disposed in adjacent, surface-to-surface relation with one another, said ring including a plurality of nozzles arranged in a spaced apart manner around a surface of the ring, each of said nozzles including:
   i) fuel metering structure formed in at least one plate with a bowl-shaped fuel swirl chamber shaped by etching such that fuel to be sprayed can move therein in a vortex motion toward the center of the fuel swirl chamber; and a spray orifice in fluid communication with the center of the fuel swirl chamber and extending substantially co-axial therewith such that fuel to be sprayed can move from the fuel swirl chamber to the spray orifice and then exit through the spray orifice in a spray; at least one fuel feed slot in fluid communication with the fuel swirl chamber and extending in non-radial relation thereto for supplying fuel to be sprayed; and
   ii) air swirler structure formed in at least one plate with a cylindrical air swirler passage shaped by etching through the at least one plate of the air swirler set, the cylindrical air swirler passage located in co-axial relation to the spray orifice in the fuel metering set such that fuel directed through the spray orifice passes through the air swirler passage and swirling air can be imparted to the fuel to cause the fuel to have a swirling component of motion; and at least one air feed slot in fluid communication with the air swirler passage and extending in non-radial relation thereto for supplying air to be swirled in the air swirler passage.

2. The injector assembly as in claim 1, wherein each nozzle is defined by a plurality of plates in adjacent, surface-to-surface relation with one another, with one of said plates including the bowl-shaped swirl chamber and the at least one fuel feed slot, and another of said plates including the spray orifice.

3. The injector assembly as in claim 1, wherein an air supply passage feeds the at least one air feed slot.

4. The injector assembly as in claim 1, wherein the feed ring includes a radially-inward facing surface and a radially outward facing surface, and the nozzles are arranged around the radially inward facing surface for dispensing fuel radially inward toward the central axis of the feed ring.

5. The injector assembly as in claim 1, wherein the nozzles are arranged in an evenly-spaced apart array around the feed ring.

6. The injector assembly as in claim 1, wherein the injector also includes a radially-outward projecting tab including an inlet fuel passage fluidly connected to the at least one fuel feed slot of each nozzle.

7. The injector assembly as in claim 1, wherein the fuel metering structure includes at least one plate, and the air swirler structure also includes at least one plate, with a plate of the fuel metering structure disposed in surface-to-surface adjacent relation to a plate of the air swirler structure.

8. The injector assembly as in claim 1, wherein the plates are formed of metal.

9. The injector assembly as in claim 1, and further including a barrel-shaped housing surrounding and supporting the feed ring.

10. The injector assembly as in claim 9, wherein the housing comprises an upstream barrel portion and a downstream barrel portion, each portion including a chamber portion, which when the barrel portions are assembled together, define a ring chamber receiving and supporting the feed ring.

11. The injector assembly as in claim 10, wherein one of said barrel portions includes an inner annular flange, radially inward disposed of the feed ring, and a plurality of ports circumferentially aligned with each spray orifice in the fuel metering structure such that fuel directed through the spray orifice passes radially-inward through a respective port of the one barrel portion.

12. The injector assembly as in claim 11, wherein the inner annular flange of the one barrel portion radially inward supports the feed ring.

13. The injector assembly as in claim 9, wherein the housing includes an inner annular flange, radially inward disposed of the feed ring, and including a plurality of ports circumferentially aligned with each spray orifice in the fuel metering structure such that fuel directed through the spray orifice passes through a respective port, the inner annular flange having a venturi configuration radially inwardly-projecting into the central annulus of the barrel and defining an upstream barrel portion and a downstream barrel portion, and the ports are arranged on the venturi configuration, such that fuel dispensed through the spray orifices remains substantially separated from interior walls of the housing along the downstream barrel portion.

14. The injector assembly as in claim 12, wherein the ports are arranged along about an axial midpoint of the venturi configuration.

15. A fuel injector assembly for turbine applications, comprising:
   a housing having an inlet fuel passage for receiving and directing fuel through the housing;
   an injector assembly supported by the housing, the injector assembly including a barrel-shaped housing; and an injector comprising a feed strip formed into a ring configuration, said injector including a plurality of stacked plates of etchable material, said injector including a plurality of nozzles arranged in a spaced apart manner around the ring, each of said nozzles including:
   i) a metering assembly formed in at least one plate with a bowl-shaped fuel swirl chamber shaped by etching such that fuel to be sprayed from the injector can move therein in a vortex motion toward the center of the swirl chamber; and a spray orifice in fluid communication with the center of the swirl chamber and extending substantially co-axial therewith such that fuel to be sprayed from the injector can move from the swirl chamber to the spray orifice and then exit through the spray orifice in a spray; at least one feed slot in fluid communication with the fuel passages in the feed stem and with the swirl chamber and extending in non-radial relation with respect to the swirl chamber for supplying fuel to be sprayed through the injector; and  ii) an air swirler formed in at least one plate with a cylindrical air swirler passage shaped by etching through the at least one plate of the air swirler set, the cylindrical air swirler passage located in co-axial relation to the spray orifice in the metering assembly such that fuel directed through the spray orifice passes through the air swirler passage and swirling air can be imparted to the fuel to cause the fuel to have a swirling component of motion; and at least one air feed slot in fluid communication with the air swirler passage and extending in non-radial relation thereto for supplying air to be swirled in the air swirler passage, wherein the housing surrounds and supports the feed ring.

16. The fuel injector assembly as in claim 15, wherein the metering assembly includes a plurality of plates in adjacent, surface-to-surface relation with one another, with one of said plates of the metering assembly including the bowl-shaped swirl chamber and the at least one feed slot, and another of said plates of the metering assembly including the spray orifice.

17. The fuel injector assembly as in claim 16, wherein an air supply passage feeds the at least one air feed slot.

18. The fuel injector assembly as in claim 17, wherein the air supply passage extends through the multiple plates of the air swirler and fluidly connects with an air supply passage extending through the housing.

19. The fuel injector assembly as in claim 15, wherein the plates are formed of metal.

20. The fuel injector assembly as in claim 15, wherein the feed ring includes a radially-inward facing surface and a radially outward facing surface, and the nozzles are arranged around the radially inward facing surface for dispensing fuel radially inward toward the central axis of the feed ring.

21. The fuel injector assembly as in claim 18, wherein the nozzles are arranged in an evenly-spaced apart array around the ring.

22. The fuel injector assembly as in claim 15, wherein the feed ring includes a radially-outward projecting tab including an inlet passage fluidly connected to the at least one feed slot of each metering set, the tab sealing against an end surface of a radially-enlarged annular flange of the housing, and a fluid passage in the housing flange fluidly connected to the inlet passage in the tab.

23. The fuel injector assembly as in claim 15, wherein the metering assembly includes at least one plate, and the air swirler also includes at least one plate, with a plate of the metering assembly disposed in surface-to-surface adjacent relation to a plate of the air swirler.

24. The fuel injector assembly as in claim 15, wherein the housing comprises an upstream barrel portion and a downstream barrel portion, each portion including a chamber portion, which when the barrel portions are assembled together, define a ring chamber receiving and supporting the feed ring.

25. The fuel injector assembly as in claim 24, wherein one of said barrel portions includes an inner annular flange, radially inward disposed of the feed ring, and including a plurality of ports circumferentially aligned with each spray orifice in the metering set such that fuel directed through the spray orifice passes radially-inward through a respective port of the barrel portion.

26. The fuel injector assembly as in claim 25, wherein the inner annular flange of the one barrel portion radially inward supports the feed ring.

27. The fuel injector assembly as in claim 15, wherein the housing includes an inner annular flange, radially inward disposed of the feed ring, and a plurality of ports circumferentially aligned with each spray orifice in the metering set such that fuel directed through the spray orifice passes through a respective port, the inner annular flange having a venturi configuration radially inwardly-projecting into the central annulus of the barrel and defining an upstream barrel portion and a downstream barrel portion, and the ports are arranged on the venturi configuration, such that fuel dispensed through the spray orifices remains substantially separated from interior walls of the housing along the downstream barrel portion.

28. The fuel injector assembly as in claim 27, wherein the ports are arranged along about an axial midpoint of the venturi configuration.

29. A combustion system, comprising:

a combustor; and an injector assembly mounted to an upstream wall of the combustor, the injector assembly including a barrel-shaped housing; and an injector comprising a feed strip formed into a ring configuration, said ring including a plurality of stacked plates of etchable material, said ring including a plurality of nozzles arranged in a spaced apart manner around the feed ring, each of said nozzles including a metering assembly and an air swirler with configurations such that fuel is sprayed from the injector and swirling air can be imparted to the fuel to cause the fuel to have a swirling component of motion; and wherein the housing surrounds and supports the feed ring, wherein the housing includes an inner annular flange, radially inward disposed of the feed ring, and including a plurality of ports circumferentially aligned with each spray orifice in the metering set such that fuel directed through the spray orifice passes through a respective port, the inner annular flange having a venturi configuration radially inwardly-projecting into the central annulus of the barrel and defining an upstream barrel portion and a downstream barrel portion, and the ports are arranged on the venturi configuration, such that fuel dispensed through the spray orifices remains substantially separated from interior walls of the housing along the downstream barrel portion.

30. The combustion system as in claim 29, wherein an inner annular flange of the one barrel portion radially inward supports the feed ring.

31. The combustion system as in claim 29, wherein the ports are arranged along about an axial midpoint of the venturi configuration.

32. The combustion system as in claim 29, further including means for dispensing the fuel in a spray and means for imparting air in a swirling motion to the fuel to cause the fuel to have a swirling component of motion.

* * * * *